United States Patent
Won et al.

(10) Patent No.: US 8,045,093 B2
(45) Date of Patent: Oct. 25, 2011

(54) BACKLIGHT UNIT AND LIQUID CRYSTAL DISPLAY DEVICE HAVING THE SAME

(75) Inventors: Se Chang Won, Gyeonggi-do (KR); Duck Su Kim, Gyeonggi-do (KR); Min Joo Kim, Seoul (KR); Eun Ju Kim, Gyeonggi-do (KR); Hyeuk Chan Kwon, Gyeongsangbuk-do (KR); Jae Jung Han, Seoul (KR); Dong Seok Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 212 days.

(21) Appl. No.: 12/074,069

(22) Filed: Feb. 29, 2008

(65) Prior Publication Data

US 2008/0239202 A1 Oct. 2, 2008

(30) Foreign Application Priority Data

Mar. 30, 2007 (KR) .................. 10-2007-0031598
Dec. 20, 2007 (KR) .................. 10-2007-0134015

(51) Int. Cl.
*G02F 1/1335* (2006.01)
(52) U.S. Cl. .......................................................... 349/64
(58) Field of Classification Search ..................... 349/64
See application file for complete search history.

(56) References Cited

U.S. PATENT DOCUMENTS

| 7,474,464 | B2 * | 1/2009 | Wang et al. .................. 359/599 |
| 2004/0233665 | A1 | 11/2004 | West et al. |
| 2005/0219836 | A1 | 10/2005 | Hung |
| 2006/0066773 | A1 * | 3/2006 | Huang .......................... 349/64 |

FOREIGN PATENT DOCUMENTS

| CN | 2006109818 A1 | 10/2006 |
| WO | WO 2006/109818 | 10/2006 |

\* cited by examiner

*Primary Examiner* — Richard Kim
(74) *Attorney, Agent, or Firm* — Morgan, Lewis & Bockius LLP

(57) ABSTRACT

A backlight unit for slimmed structure and exhibiting uniform brightness through the improvement of its luminance efficiency and the quality in appearance of which is improved by the removal of bright lines, and a liquid crystal display device having the same are disclosed. The backlight unit includes a plurality of light emitting lamps disposed above a cover bottom such that the light emitting lamps are arranged at regular intervals, a diffusion plate disposed above the light emitting lamps, the diffusion plate including a substrate, a light control part formed on the bottom surface of the substrate corresponding to the light emitting lamps, and lens parts mounted on the top surface of the substrate, and an optical film disposed above the diffusion plate.

10 Claims, 12 Drawing Sheets

BACKLIGHT UNIT AND LIQUID CRYSTAL DISPLAY DEVICE HAVING THE SAME

CROSS-REFERENCE TO RELATED APPLICATION

This application claims the benefit of Korean Patent Application No. 10-2007-0031598, filed on Mar. 30, 2007 and 10-2007-0134015, filed on Dec. 20, 2007, which are hereby incorporated by reference in its.

BACKGROUND OF THE INVENTION

1. Field of the Invention

The present invention relates to a backlight unit, and more particularly, to a backlight unit for slimmed structure and exhibiting high brightness through the improvement of its luminance efficiency and the quality in appearance of which is improved by the removal of bright lines, and a liquid crystal display device having the same.

2. Discussion of the Related Art

A cathode ray tube (CRT), one of the generally used display devices, has been mainly used in television receivers (TV) and monitors of measuring instruments or information terminals. However, the CRT has a relatively heavy weight and a large size. Thus, the CRT cannot satisfy the current demands of small size and light weight.

Hence, flat panel display devices, such as a liquid crystal display device (LCD) using an electric field optical effect, a plasma display panel device (PDP) using a gas discharge, and an electro luminescence display device (ELD) using an electric field luminous effect, have been proposed to substitute for the CRT device. Among them, much research has been carried out on the LCD.

The liquid crystal display device is much slimmer and lighter than any other display devices, and it requires less power consumption. Recently, the liquid crystal display device has been developed to such an extent that the liquid crystal display device sufficiently serves as a flat panel display device, with the result that the liquid crystal display device has been used in monitors of desktop computers and large-sized information display devices as well as monitors of laptop computers. For this reason, the demand for the liquid crystal display device is continuously increasing.

The liquid crystal display device is a non-emissive display device that displays images through the adjustment of the amount of light incident from the outside, and therefore, the liquid crystal display device needs an additional light source for irradiating light to an LCD panel, i.e., a backlight unit.

Generally, the backlight unit, used as the light source of the liquid crystal display device, may be classified as a direct-type backlight unit or an edge-type backlight unit based on the arrangement of cylindrical fluorescent lamps.

The edge-type backlight unit is constructed in a structure in which a lamp unit is mounted at the side of a light guide plate for guiding light. The lamp unit includes a lamp for emitting light, lamp holders fitted on opposite ends of the lamp for protecting the lamp, and a lamp reflection plate surrounding the outer circumference of the lamp, while one side of the lamp reflection plate is fitted into the side of the light guide plate, for reflecting the light, emitted from the lamp, toward the light guide plate.

The edge-type backlight unit, constructed such that the lamp unit is mounted at the side of the light guide plate, is applied to relatively small-sized liquid crystal display devices, such as monitors of laptop computers and monitors of desktop computers. The edge-type backlight unit exhibits a high light uniformity and durability, and the edge-type backlight unit is advantageous to the slimness of a liquid crystal display device to which the edge-type backlight unit is applied.

On the other hand, the direct-type backlight unit has been intensively developed with the increase in size of the liquid crystal display device to more than 20 inches. The direct-type backlight unit is constructed in a structure in which a plurality of lamps are arranged at the bottom of a diffusion plate in a line to directly irradiate light to the front of an LCD panel.

The direct-type backlight unit exhibits a higher optical efficiency than the edge-type backlight unit. For this reason, the direct-type backlight unit is mainly used in a large-sized liquid crystal display device requiring a high level of brightness.

However, a liquid crystal display device adopting the direct-type backlight unit, used in large-sized monitors or large-sized television receivers, is normally used for a longer period of time than a liquid crystal display device adopting the edge-type backlight unit, used in laptop computers. Furthermore, the liquid crystal display device adopting the direct-type backlight unit has a larger number of lamps than the liquid crystal display device adopting the edge-type backlight unit. As a result, a possibility of some lamps not lighting due to breakage and death of the lamps is stronger in the liquid crystal display device adopting the direct-type backlight unit than the liquid crystal display device adopting the edge-type backlight unit.

In the liquid crystal display device adopting the direct-type backlight unit, the diffusion plate is manufactured by forming milk-white resin, such as acryl or polycarbonate, mixed with a diffusion agent, into a plate shape by extruding molding using rolls and printing a pattern on the extruded plate.

Even though the above-described diffusion plate is disposed in the liquid crystal display device, however, a brightness difference occurs between regions where the lamps are disposed and remaining regions where the lamps are not disposed, with the result that it is possible to accomplish uniform brightness throughout the backlight unit and the liquid crystal display device.

Furthermore, even though the above-described diffusion plate is disposed in the liquid crystal display device, the shapes of the lamps, disposed below the diffusion plate, appear on the top, i.e., bright lines appear on the top, with the result that the quality in appearance of the backlight unit and the liquid crystal display device deteriorates.

SUMMARY OF THE INVENTION

Accordingly, the present invention is directed to a backlight unit and a liquid crystal display device having the same that substantially obviates one or more problems due to limitations and disadvantages of the related art.

An object of the present invention is to provide a backlight unit exhibiting uniform brightness through the improvement of its luminance efficiency and the quality in appearance of which is improved by the removal of bright lines, and a liquid crystal display device having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a plurality of light emitting lamps disposed above a cover bottom such that the light emitting lamps are arranged at regular intervals, a diffusion plate disposed above the light emitting lamps, a light control part formed on the bottom surface of the substrate corresponding to the light emitting lamps, and lens parts mounted on the top surface of the substrate, and an optical film disposed above the diffusion plate.

Preferably, the light control part includes a reflection pattern or a scattering pattern.

In a further aspect of the present invention, a liquid crystal display device includes a backlight unit including a plurality of light emitting lamps disposed above a cover bottom such that the light emitting lamps are arranged at regular intervals, a diffusion plate disposed above the light emitting lamps, the diffusion plate including a transparent substrate, a light control part, having a reflection pattern or a scattering pattern, formed at the bottom of the substrate corresponding to the light emitting lamps, and lens parts mounted at the top of the substrate, and an optical film disposed above the diffusion plate; and a liquid crystal panel disposed above the backlight unit, the liquid crystal panel including an upper substrate and a lower substrate connected to each other while the upper substrate and the lower substrate are spaced a predetermined distance from each other such that crystal liquid is filled in the space between the upper substrate and the lower substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

First, a backlight unit according to a first embodiment of the present invention will be described in detail.

Figure 1:
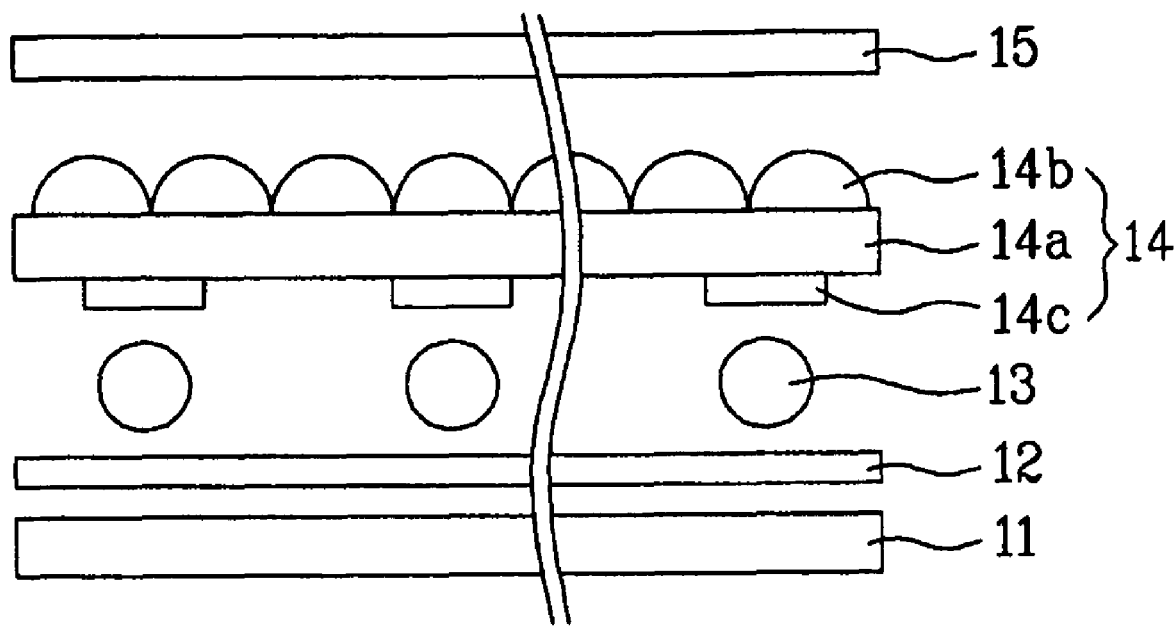
FIG. 1 is a sectional view illustrating the structure of a backlight unit according to a first embodiment of the present invention.
Figure 2A:
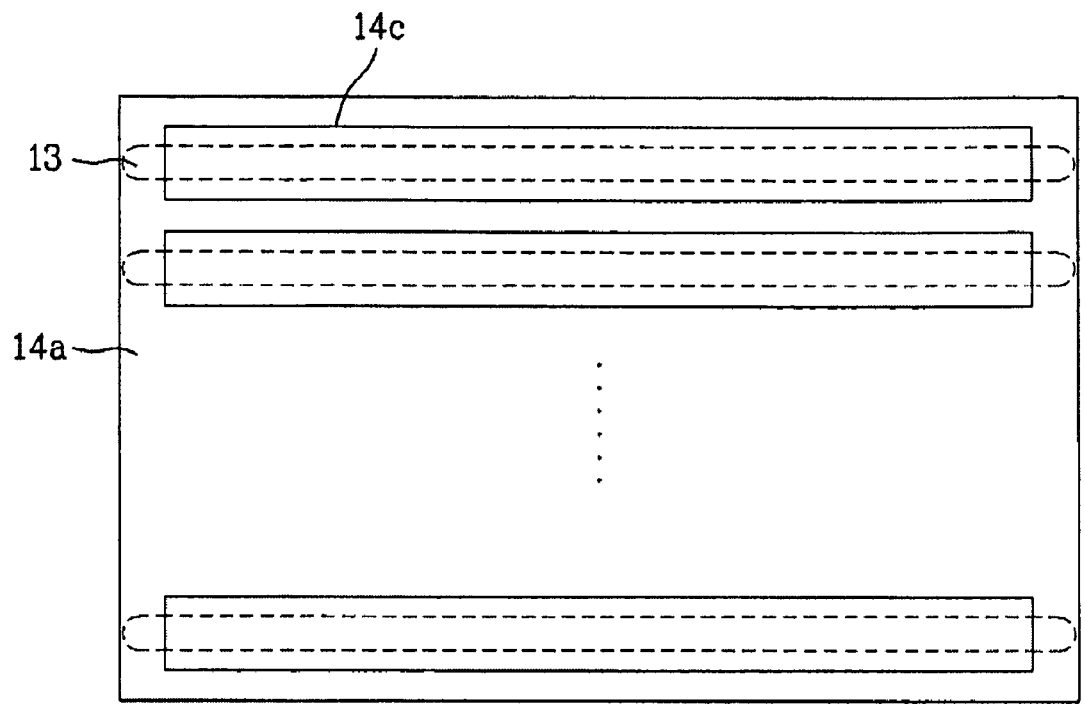
FIGS. 2A and 2B are views illustrating the structure of a reflection layer of a diffusion plate of the backlight unit according to the first embodiment of the present invention.
Figure 2B:
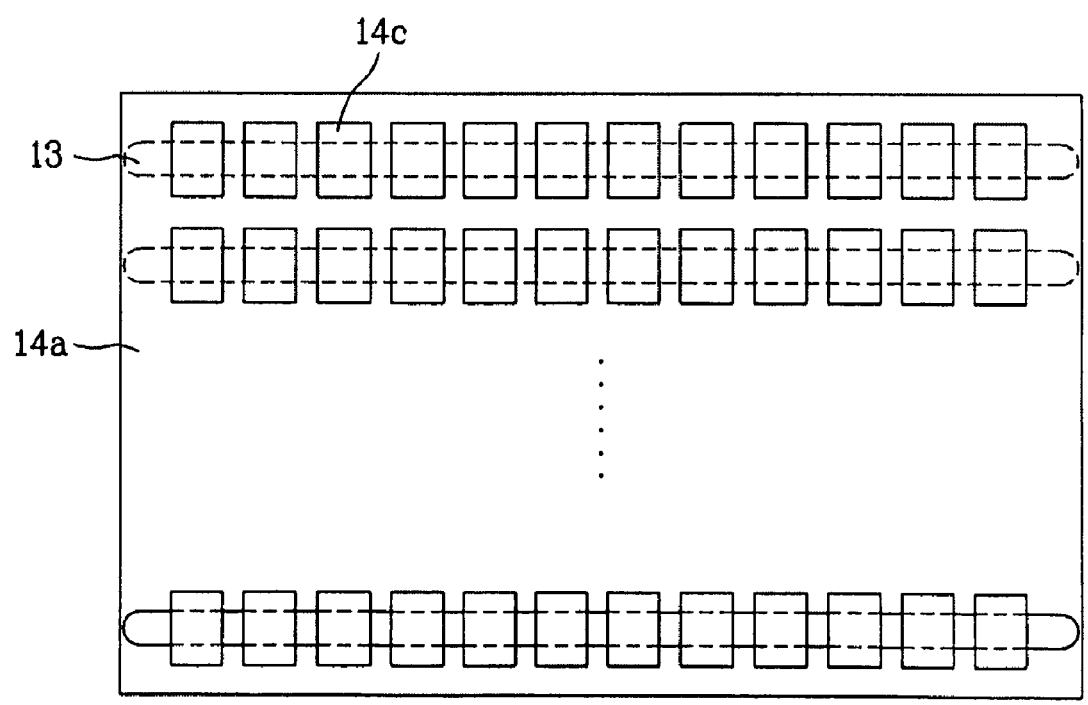

FIG. 1 is a sectional view illustrating the structure of a backlight unit according to a first embodiment of the present invention, and FIGS. 2A and 2B are views illustrating the structure of a reflection layer of a diffusion plate of the backlight unit according to the first embodiment of the present invention.

As shown in FIG. 1, the backlight unit according to the first embodiment of the present invention is constructed in a structure in which a plurality of light emitting lamps 13 are disposed above a cover bottom 11 such that the light emitting lamps 13 are arranged at regular intervals.

Electro luminescence (EL), light emitting diodes (LED), cold cathode fluorescent lamps (CCFL), hot cathode fluorescent lamps (HCFL), or external electrode fluorescent lamps (EEFL) may be used as the light emitting lamps 13.

Above the light emitting lamps 13 is disposed a diffusion plate 14 for scattering light, emitted from the light emitting lamps 13, such that the light is uniformly transmitted upward.

Above the diffusion plate 14 is disposed an optical film 15 for transmitting the scattered light upward.

Above the cover bottom 11 is disposed a reflection plate 12. Although not shown in the drawings, the optical film 15, disposed above the diffusion plate 14, may be constructed in a structure in which first and second prism sheets and protection films are sequentially stacked.

The diffusion plate 14 scatters the light, incident from the light emitting lamps 13, to prevent the partial concentration of the light.

The structure of the diffusion plate 14, among the above-described components of the backlight unit, will be described in detail. The diffusion plate 14 includes a substrate 14a, lens parts 14b, and reflection parts 14c.

The substrate 14a is made of a transparent material having a transmissivity of more than 80%. Preferably, the substrate 14a is made of a transparent material having a transmissivity of more than 90% to satisfy the optimum condition.

Specifically, the substrate 14a of the diffusion plate 14 may be made of polymethyl methacrylate (PMMA), poly carbonate (PC), poly steel (PS), or metal steel (MS).

In the drawings, the lens parts 14b are illustrated to be formed in the sectional shape of a hemisphere, although the lens parts 14b may be formed in the shape of a lens, prism, pyramid, or embossed structure.

For example, the lens parts 14b may be continuously arranged in a line structure or may be arranged in a dot structure.

The lens parts 14b may be made of the same material as the substrate 14a. Alternatively, the lens parts 14b may be made of a material having a transmissivity different from that of the material of the substrate 14a.

The light, emitted from the light emitting lamps 13, is reflected by the reflection parts 14c, and is then diffused and reflected by the reflection plate 12, disposed below the light emitting lamps 13, whereby the shapes of the light emitting lamps 13 do not appear on the diffusion plate 14. In the first embodiment, the reflection parts 14c are disposed above the respective light emitting lamps 13 at positions corresponding to the respective light emitting lamps 13.

The reflection parts 14c are made of a material having a transmissivity of 50 to 95%, such as $TiO_2$, $Al_2O_3$, MgO, Ba, or Ag.

In this case, it is possible to change the thickness and shape of the reflection parts 14c based on the degree of the transmissivity of the material constituting the reflection parts 14c.

For example, when the reflection parts 14c are made of a material exhibiting a high reflection property, the reflection parts 14c may be arranged in a line structure or in a dot structure, as shown in FIG. 2A or 2B. On the other hand, when the reflection parts 14c are made of a material exhibiting a low reflection property, the reflection parts 14c are preferably arranged in a line structure rather than in a dot structure, as shown in FIG. 2A. However, the above structure is merely an example illustrating the present invention. Consequently, the reflection parts 14c may be arranged in a dot structure, even when the reflection parts 14c are made of a material exhibiting a low reflection property.

It is possible to reduce the thickness of the reflection parts 14c when the reflection parts 14c are made of a material exhibiting a high reflection property than when the reflection parts 14c are made of a material exhibiting a low reflection property.

When the reflection parts 14c are arranged in the dot structure, the dots constituting the reflection parts 14c may be formed in the shape of a rectangle as shown in FIG. 2B. However, the dots constituting the reflection parts 14c may be also formed in the shape of a polygon, including a triangle, a pentagon, and a hexagon, or a circle.

In the backlight unit with the above-stated construction, light is emitted from the light emitting lamps 13, and is then diffused and condensed through the diffusion plate 14 and the optical film 15. After that, the light is transmitted upward.

At this time, the light, emitted from the light emitting lamps 13, is reflected downward by the reflection parts 14c of the diffusion plate 14, located above the light emitting lamps 13 at the positions corresponding to the light emitting lamps 13, and the light is transmitted upward by the reflection plate 12, whereby the occurrence of the shapes of the light emitting lamps 13 appearing on the top is effectively prevented.

Hereinafter, a liquid crystal display device including the backlight unit with the above-stated construction will be described.

Figure 5:
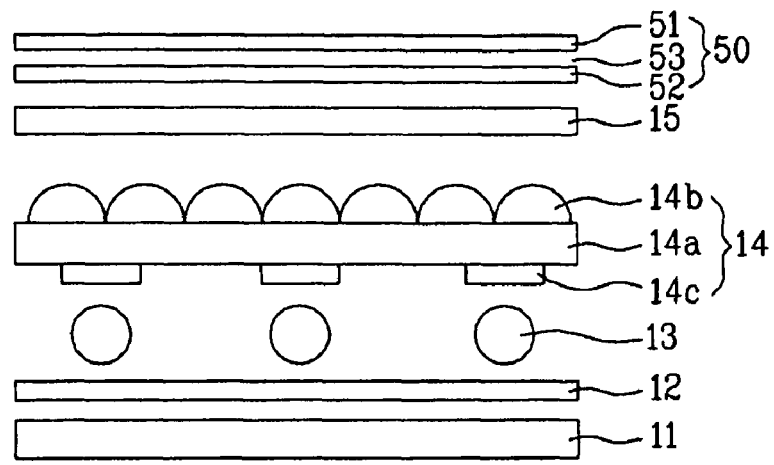
FIG. 5 is a sectional view illustrating the structure of a liquid crystal display device including the backlight unit according to the first embodiment of the present invention.

FIG. 5 is a sectional view illustrating the structure of a liquid crystal display device including the backlight unit according to the first embodiment of the present invention.

As shown in FIG. 5, the liquid crystal display device according to the present invention includes a liquid crystal panel 50 including an upper substrate 51 and a lower substrate 52 connected to each other, while the upper substrate 51 and the lower substrate 52 are spaced a predetermined distance from each other, and a crystal liquid layer 53 filled in the space between the upper substrate 51 and the lower substrate 52, and a backlight unit disposed below the liquid crystal panel 50.

The structure of the backlight unit, disposed below the liquid crystal panel 50, was previously described in detail with reference to FIG. 1, and therefore, a further detailed description thereof will not be given.

Although not shown in the drawing, the lower substrate 52 is constructed as follows. A plurality of gate lines are arranged on the lower substrate 52 in one direction at regular intervals to define pixel areas. A plurality of data lines are arranged on the lower substrate 52 in the direction perpendicular to the gate lines at regular intervals. Pixel electrodes are formed at the pixel areas where the gate lines and the data lines intersect each other. Also, thin film transistors (TFT) are formed at the intersection between the gate lines and the data lines.

On the upper substrate 51 are formed a black matrix layer for intercepting light from the region excluding the pixel areas, RGB color filter layers for color expression, and a common electrode for realizing a picture.

Each thin film transistor (TFT) may be constructed in various structures. For example, each TFT may include a gate electrode protruding from the corresponding gate line, a gate insulation film formed at the whole surface thereof, an active layer formed on the gate insulation layer above the gate electrode, a source electrode protruding from the corresponding data line, and a drain electrode disposed opposite to the source electrode.

The pixel electrodes are made of a transparent conductive metal material exhibiting a relatively high light transmissivity, such as indium tin oxide (ITO).

The liquid crystal layer, located on the pixel electrodes, is oriented by signals applied from the thin film transistors (TFT), and the amount of light transmitting through the liquid crystal layer is controlled depending upon the degree of the orientation of the liquid crystal layer, whereby the picture is expressed.

In the above, the structure of a general TN mode liquid crystal display device was suggested, although an in-plane switching mode liquid crystal display device may be also used.

In the above-described liquid crystal display device, light is emitted from the light emitting lamps 13, and is then diffused and condensed through the diffusion plate 14 and the optical film 15. Subsequently, the light is incident onto the liquid crystal panel 50.

The incident light reaches the liquid crystal layer 53 through the lower substrate 52 of the liquid crystal panel 50.

At this time, the light, emitted from the light emitting lamps 13, is reflected downward by the reflection parts 14c, formed at the lower part of the diffusion plate 14, and the light is transmitted upward by the reflection plate 12, whereby the occurrence of the shapes of the light emitting lamps 13 appearing on the top is effectively prevented.

The present invention is not limited to the above-described embodiment, but includes various forms that can be easily derived from the embodiment by those skilled in the art to which the present invention pertains.

Meanwhile, the backlight unit according to the first embodiment of the present invention may be used as a light source at the rear or in the front of various display devices, including the above-described liquid crystal display device. In addition, the backlight unit may be used independently as a light emitting device.

Second Embodiment

First, a backlight unit according to a second embodiment of the present invention will be described in detail.

Figure 3:
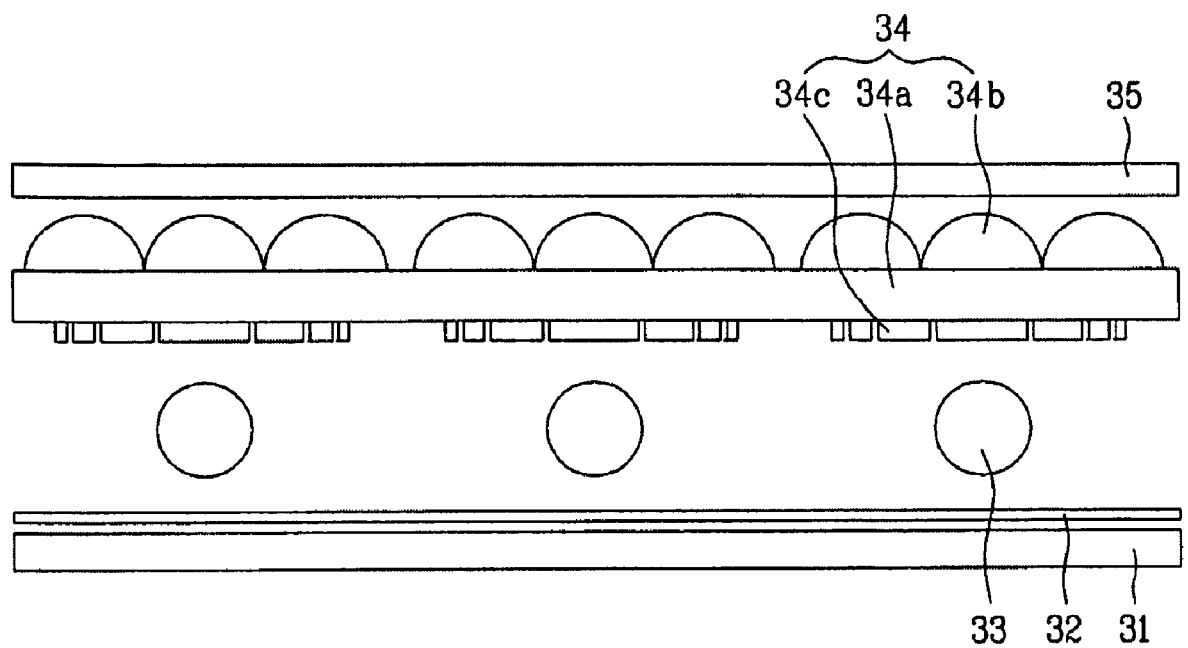
FIG. 3 is a sectional view illustrating the structure of a backlight unit according to a second embodiment of the present invention.
Figure 4A:
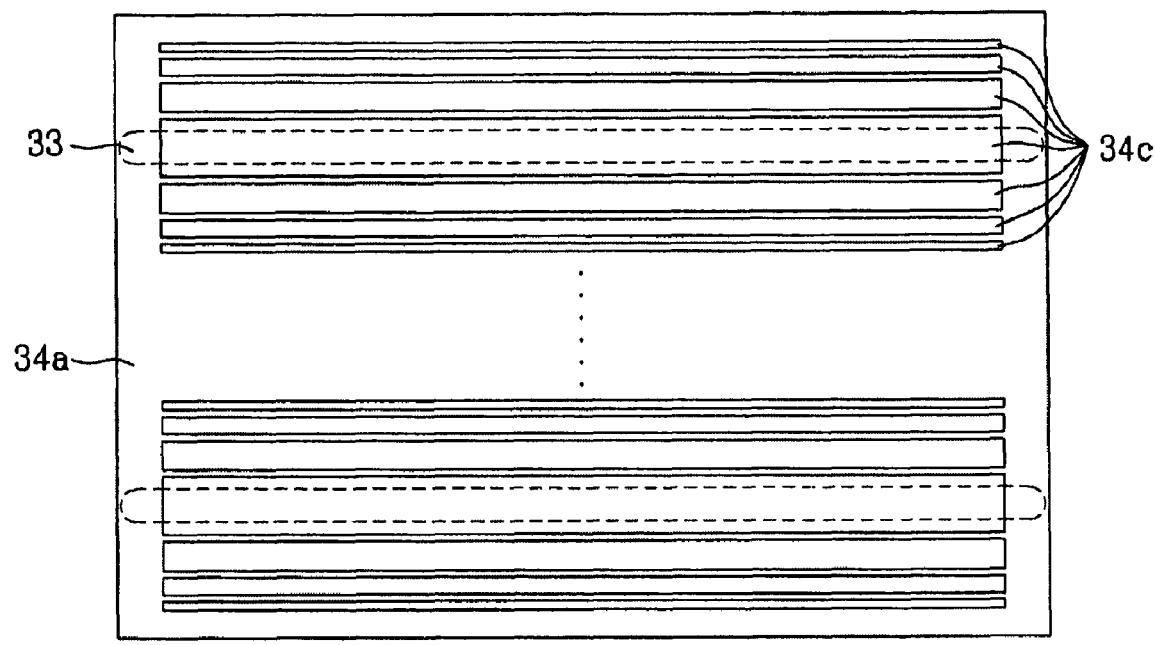
FIGS. 4A and 4B are views illustrating the structure of a reflection layer of a diffusion plate of the backlight unit according to the second embodiment of the present invention.
Figure 4B:
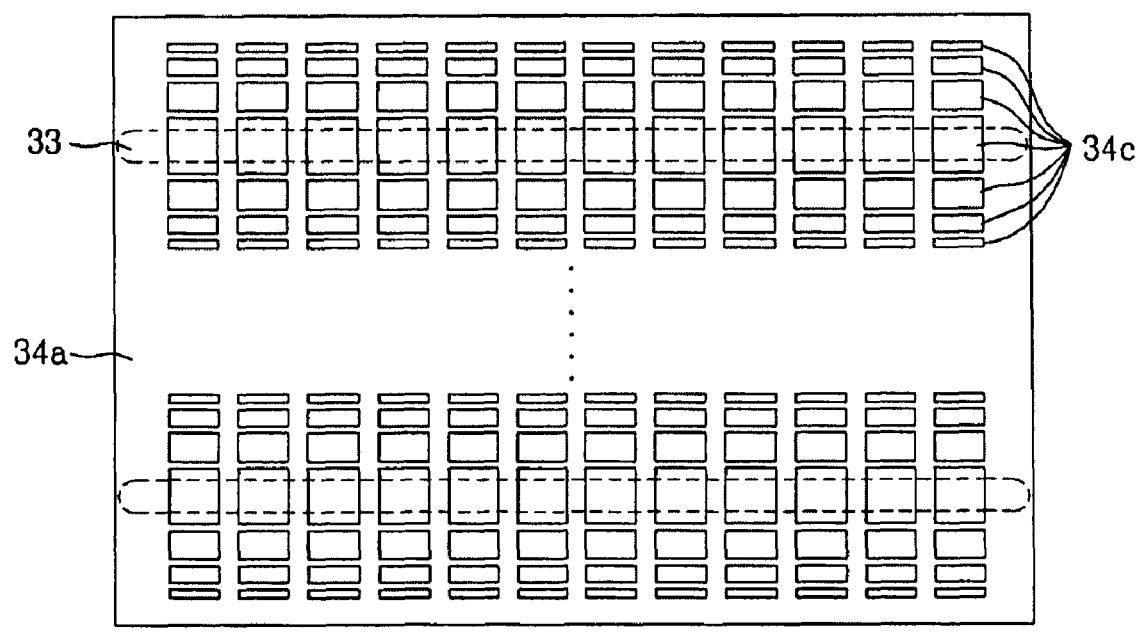

FIG. 3 is a sectional view illustrating the structure of a backlight unit according to a second embodiment of the present invention, and FIGS. 4A and 4B are views illustrating the structure of a reflection layer of a diffusion plate of the backlight unit according to the second embodiment of the present invention.

As shown in FIG. 3, the backlight unit according to the second embodiment of the present invention is constructed in a structure in which a plurality of light emitting lamps 33 disposed above a cover bottom 31 such that the light emitting lamps 33 are arranged at regular intervals.

Electro luminescence (EL), light emitting diodes (LED), cold cathode fluorescent lamps (CCFL), hot cathode fluorescent lamps (HCFL), or external electrode fluorescent lamps (EEFL) may be used as the light emitting lamps 32.

Above the light emitting lamps 33 is disposed a diffusion plate 34 for scattering light, emitted from the light emitting lamps 33, such that the light is uniformly transmitted upward.

Above the diffusion plate 34 is disposed an optical film 35 for transmitting the scattered light upward.

Above the cover bottom 31 is disposed a reflection plate 32. Although not shown in the drawings, the optical film 35, disposed above the diffusion plate 34, may be constructed in a structure in which first and second prism sheets and protection films are sequentially stacked.

The diffusion plate 34 scatters the light, incident from the light emitting lamps 33, to prevent the partial concentration of the light.

The structure of the diffusion plate 34, among the above-described components of the backlight unit, will be described in detail. The diffusion plate 34 includes a substrate 34a, lens parts 34b, and reflection parts 34c.

The substrate 34a is made of a transparent material having a transmissivity of more than 80%. Preferably, the substrate 14a is made of a transparent material having a transmissivity of more than 90% to satisfy the optimum condition.

Specifically, the substrate 34a of the diffusion plate 34 may be made of polymethyl methacrylate (PMMA), poly carbonate (PC), poly steel (PS), or metal steel (MS).

In the drawings, the lens parts 34b are illustrated to be formed in the sectional shape of a hemisphere, although the lens parts 34b may be formed in the shape of a lens, prism, pyramid, or embossed structure.

For example, the lens parts 34b may be continuously arranged in a line structure or may be arranged in a dot structure.

The lens parts 34b may be made of the same material as the substrate 34a. Alternatively, the lens parts 34b may be made of a material having a transmissivity different from that of the material of the substrate 34a.

The light, emitted from the light emitting lamps 33, is reflected by the reflection parts 34c, and is then diffused and reflected by the reflection plate 32, disposed below the light emitting lamps 33, whereby the shapes of the light emitting lamps 33 do not appear on the diffusion plate 34.

In the second embodiment, the reflection parts 34c are disposed such that the reflection parts 34c are located right above the respective light emitting lamps 33 and adjacent to the respective light emitting lamps 33. The reflection parts 34c have the largest width at the positions where the reflection parts 34c are located right above the respective light emitting lamps 33, and the width of the reflection parts 34c is gradually decreased with the increase of the distance from the respective light emitting lamps 33.

Also, although not shown in the drawings, the reflection parts 34c are constructed in a structure in which the reflection parts 34c are dense or wide at the middles thereof in the longitudinal direction of the light emitting lamps 33, and the width of the reflection parts 34c is gradually reduced toward the edges of the light emitting lamps 33 such that the width of the reflection parts 34c at the edges of the light emitting lamps 33 is less than that of the reflection parts 34c at the middles of the light emitting lamps 33.

This is because the brightness of the light emitting lamps 33 at the middles thereof is greater than that of the light emitting lamps 33 at the edges thereof, with the result that the lamp appearing phenomenon occurs more strikingly at the middles of the light emitting lamps 33 than at the edges of the light emitting lamps 33.

The reflection parts 34c are made of a material having a transmissivity of 50 to 95%, such as $TiO_2$, $Al_2O_3$, MgO, Ba, or Ag.

In this case, it is possible to change the thickness and shape of the reflection parts 34c based on the degree of the transmissivity of the material constituting the reflection parts 34c.

For example, when the reflection parts 34c are made of a material exhibiting a high reflection property, the reflection parts 34c may be arranged in a line structure or in a dot structure, as shown in FIG. 4A or 4B. On the other hand, when the reflection parts 34c are made of a material exhibiting a low reflection property, the reflection parts 34c are preferably arranged in a line structure rather than in a dot structure, as shown in FIG. 4A. However, the reflection parts 34c may be arranged in a dot structure, even when the reflection parts 34c are made of a material exhibiting a low reflection property.

As shown in FIG. 4B, when the reflection parts 34 are arranged in the dot structure, the reflection parts 34 have the same width in the longitudinal direction of the reflection parts 34 not only at the middles thereof but also at the sides spaced apart from the middles thereof about the respective light emitting lamps 33. Alternatively, the reflection parts 34 are constructed such that the longitudinal width of the reflection parts 34 is gradually reduced toward the sides of the reflection parts 34.

It is possible to reduce the thickness of the reflection parts 34c when the reflection parts 34c are made of a material exhibiting a high reflection property than when the reflection parts 34c are made of a material exhibiting a low reflection property.

When the reflection parts 34c are arranged in the dot structure, the dots constituting the reflection parts 34c may be formed in the shape of a rectangle as shown in FIG. 4B. However, the dots constituting the reflection parts 14c may be also formed in the shape of a polygon, including a triangle, a pentagon, and a hexagon, or a circle.

In the backlight unit with the above-stated construction, light is emitted from the light emitting lamps 33, and is then diffused and condensed through the diffusion plate 34 and the optical film 35. After that, the light is transmitted upward.

At this time, the light, emitted from the light emitting lamps 33, is reflected downward by the reflection parts 34c of the diffusion plate 34, located above the light emitting lamps 33 at the positions corresponding to the light emitting lamps 33, and the light is transmitted upward by the reflection plate 32, whereby the occurrence of the shapes of the light emitting lamps 33 appearing on the top is effectively prevented.

Hereinafter, a liquid crystal display device including the backlight unit with the above-stated construction will be described.

Figure 6:
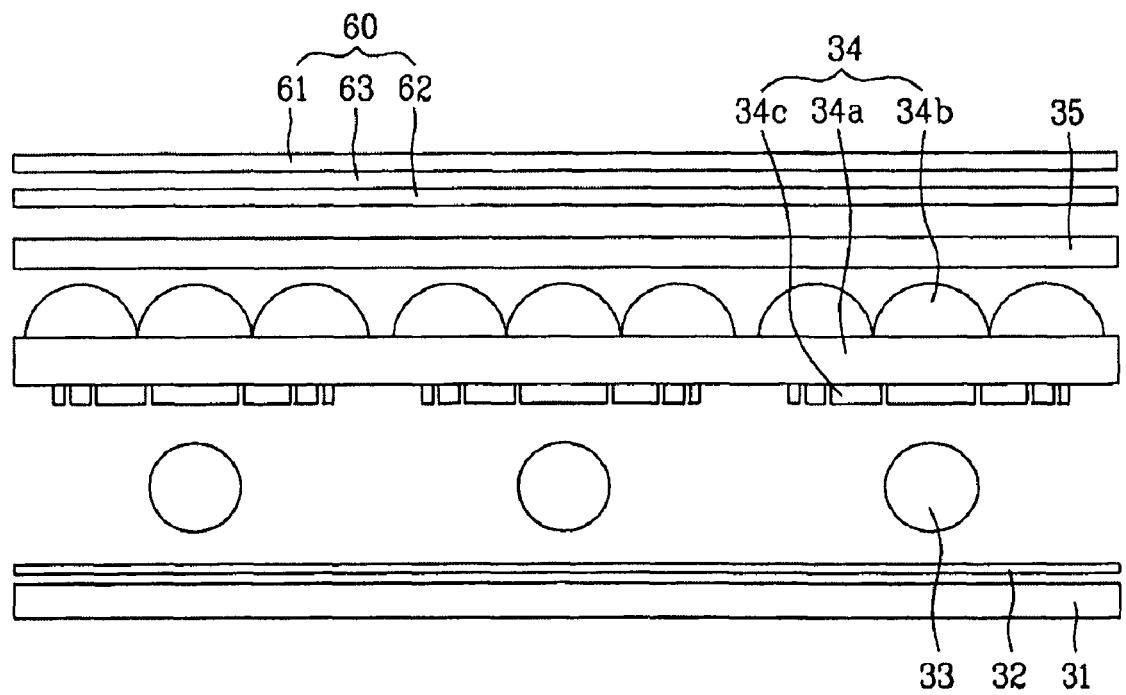
FIG. 6 is a sectional view illustrating the structure of a liquid crystal display device including the backlight unit according to the second embodiment of the present invention.

FIG. 6 is a sectional view illustrating the structure of a liquid crystal display device including the backlight unit according to the second embodiment of the present invention.

As shown in FIG. 6, the liquid crystal display device according to the present invention includes a liquid crystal panel 60 including an upper substrate 61 and a lower substrate 62 connected to each other, while the upper substrate 61 and the lower substrate 62 are spaced a predetermined distance from each other, and a crystal liquid layer 63 filled in the space between the upper substrate 61 and the lower substrate 62, and a backlight unit disposed below the liquid crystal panel 60.

The structure of the backlight unit, disposed below the liquid crystal panel 60, was previously described in detail with reference to FIG. 3, and therefore, a further detailed description thereof will not be given.

Although not shown in the drawing, the lower substrate 62 is constructed as follows. A plurality of gate lines are arranged on the lower substrate 62 in one direction at regular intervals to define pixel areas. A plurality of data lines are arranged on the lower substrate 62 in the direction perpendicular to the gate lines at regular intervals. Pixel electrodes are formed at the pixel areas where the gate lines and the data lines intersect each other. Also, thin film transistors (TFT) are formed at the intersection between the gate lines and the data lines.

On the upper substrate 61 are formed a black matrix layer for intercepting light from the region excluding the pixel areas, RGB color filter layers for color expression, and a common electrode for realizing a picture.

Each thin film transistor (TFT) may be constructed in various structures. For example, each TFT may include a gate electrode protruding from the corresponding gate line, a gate insulation film formed at the whole surface thereof, an active layer formed on the gate insulation layer above the gate electrode, a source electrode protruding from the corresponding data line, and a drain electrode disposed opposite to the source electrode.

The pixel electrodes are made of a transparent conductive metal material exhibiting a relatively high light transmissivity, such as indium tin oxide (ITO).

The liquid crystal layer, located on the pixel electrodes, is oriented by signals applied from the thin film transistors (TFT), and the amount of light transmitting through the liquid crystal layer is controlled depending upon the degree of the orientation of the liquid crystal layer, whereby the picture is expressed.

In the above, the structure of a general TN mode liquid crystal display device was suggested, although an in-plane switching mode liquid crystal display device may be also used.

Third Embodiment

Figure 7:
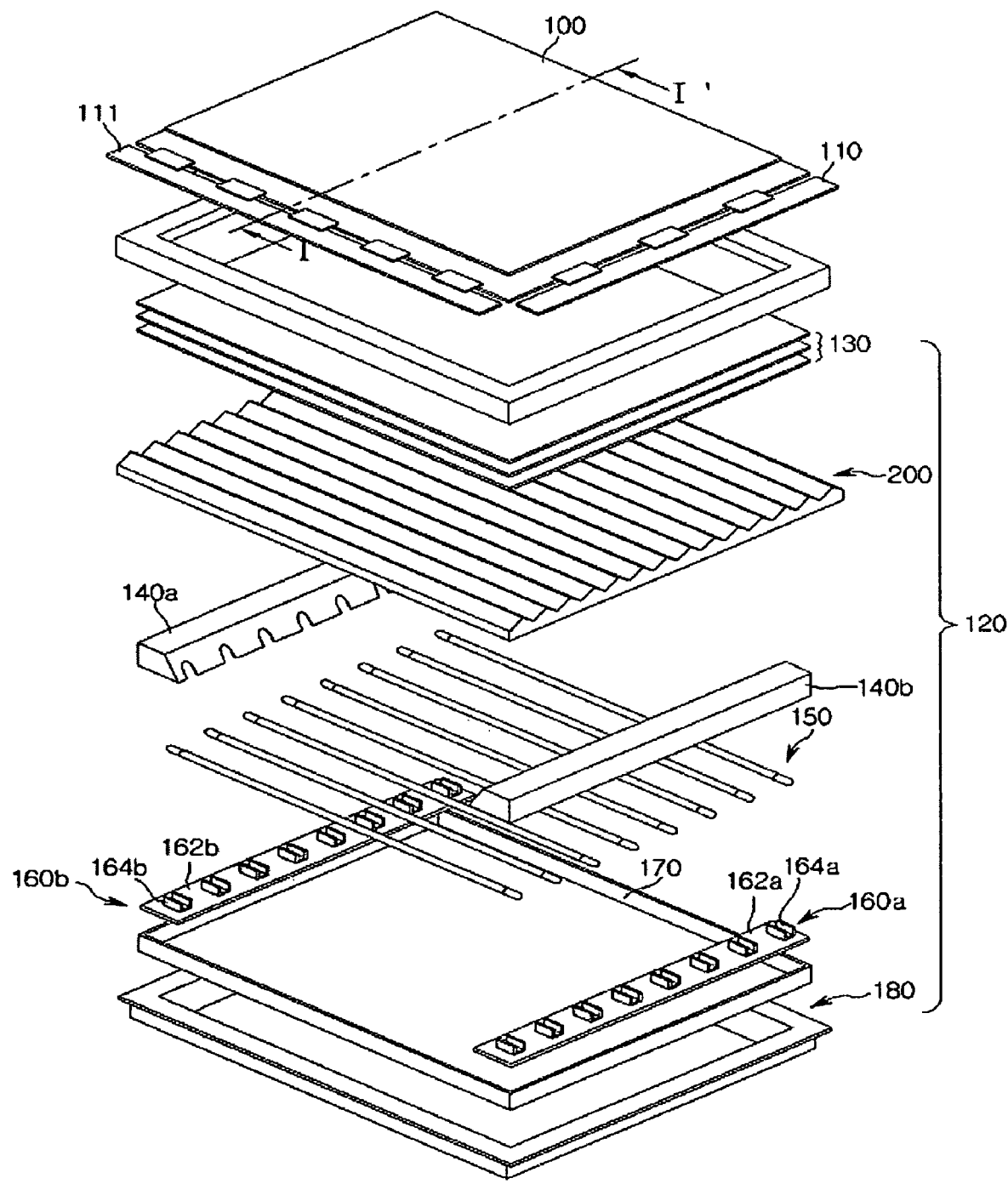
FIG. 7 is an exploded perspective view illustrating a direct-type liquid crystal display device according to a third embodiment of the present invention.
Figure 8:
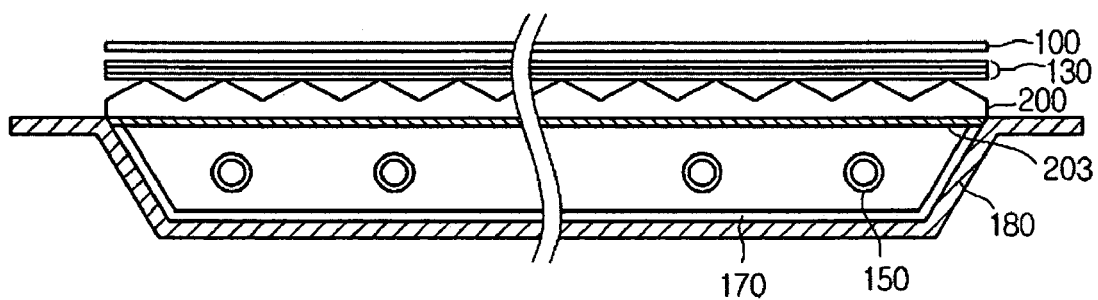
FIG. 8 is a sectional view of the direct-type liquid crystal display device taken along line I-I' of FIG. 7.

FIG. 7 is an exploded perspective view illustrating a direct-type liquid crystal display device according to a third embodiment of the present invention, and FIG. 8 is a sectional view of the direct-type liquid crystal display device taken along line I-I' of FIG. 7.

As shown in FIGS. 7 and 8, the direct-type liquid crystal display device according to the third embodiment of the present invention includes a liquid crystal display panel 100, on which an image is displayed, and a backlight unit 120 disposed at the rear of the liquid crystal display panel 100 for irradiating light.

The liquid crystal display panel 100 includes a thin film transistor (TFT) substrate and a color filter substrate connected to each other, while the TFT substrate and the color filter substrate are opposite to each other, such that a uniform cell gap is maintained between the TFT substrate and the color filter substrate, and a crystal liquid layer interposed between the TFT substrate and the color filter substrate.

Although not shown in the drawings, the liquid crystal display panel 100 is provided at the side thereof with drive units 110 and 111 for generating a drive signal to drive the liquid crystal display panel 100.

The backlight unit 120 according to the third embodiment of the present invention will be described on the assumption that the backlight unit is a direct-type backlight unit mounted in a large-sized liquid crystal display device having a size of more than 20 inches.

The backlight unit 120 includes a box-shaped bottom cover 180 having an open top, a plurality of light sources 150 disposed on the bottom cover 180 such that the light sources 150 are arranged at regular intervals, a diffusion plate 200 disposed on the light sources 150 for primarily diffusing light, optical sheets 130 disposed on the diffusion plate 200 for condensing and secondarily diffusing light, and a reflection sheet 170 disposed below the light sources 150 for reflecting light moving downward from the light sources 150 toward the liquid crystal display panel 100.

The backlight unit 120 further includes first and second light source drive units 160*a* and 160*b* disposed at opposite ends of the light sources 150 for supplying a drive signal. The first light source drive unit 160*a* includes a first drive printed circuit board (PCB) 162*a* and first sockets 164*a* mounted on the first drive PCB 162*a* such that each first socket 164*a* contacts one end of each light source 150. The second light source drive unit 160*b* includes a second drive PCB 162*b* and second sockets 164*b* mounted on the second drive PCB 162*b* such that each second socket 164*b* contacts the other end of each light source 150.

The backlight unit 120 further includes first and second support sides 140*a* and 140*b* disposed at opposite ends of light sources 150 for guiding light emitted from the light sources 150 to the edge of the liquid crystal display panel 100 while supporting the diffusion plate 200 and the optical sheets 160.

The third embodiment of the present invention is described including an external electrode fluorescent lamp (EEFL), constructed in a structure in which its electrodes surrounds the outside regions of the opposite ends of the light sources 150. However, the third embodiment of the present invention is not limited to the EEFL, but may include a cold cathode fluorescent lamp (CCFL) or a light emitting diode (LED).

The diffusion plate 200 serves to primarily diffuse light emitted from the light sources 150 and guide the primarily diffused light toward the optical sheets 130.

The diffusion plate 200 is provided at the bottom thereof, below which the light sources 150 are disposed, with a reflection pattern 203. The reflection pattern 203 is formed by ink printing.

The reflection pattern 203 has a predetermined shape (for example, a diamond shape). Silver (Ag), exhibiting a high reflexibility, may be used as material for the reflection pattern 203.

The individual pattern size of the reflection pattern 203 formed at the bottom of the diffusion plate 200 corresponding to the light sources 150 is greater than that of the reflection pattern 203 formed at the bottom of the diffusion plate 200 not corresponding to the light sources 150.

The bottom of the diffusion plate 200 corresponding to the regions where the light sources 150 are disposed and the bottom of the diffusion plate 200 corresponding to the regions where the light sources 150 are not disposed have different densities. Specifically, the reflection pattern 203 corresponding to the regions where the light sources 150 are disposed has a density higher than the reflection pattern 203 corresponding to the regions where the light sources 150 are not disposed.

The diffusion plate 200 according to the third embodiment of the present invention will be described hereinafter in detail with reference to FIGS. 9 and 10.

Figure 9:
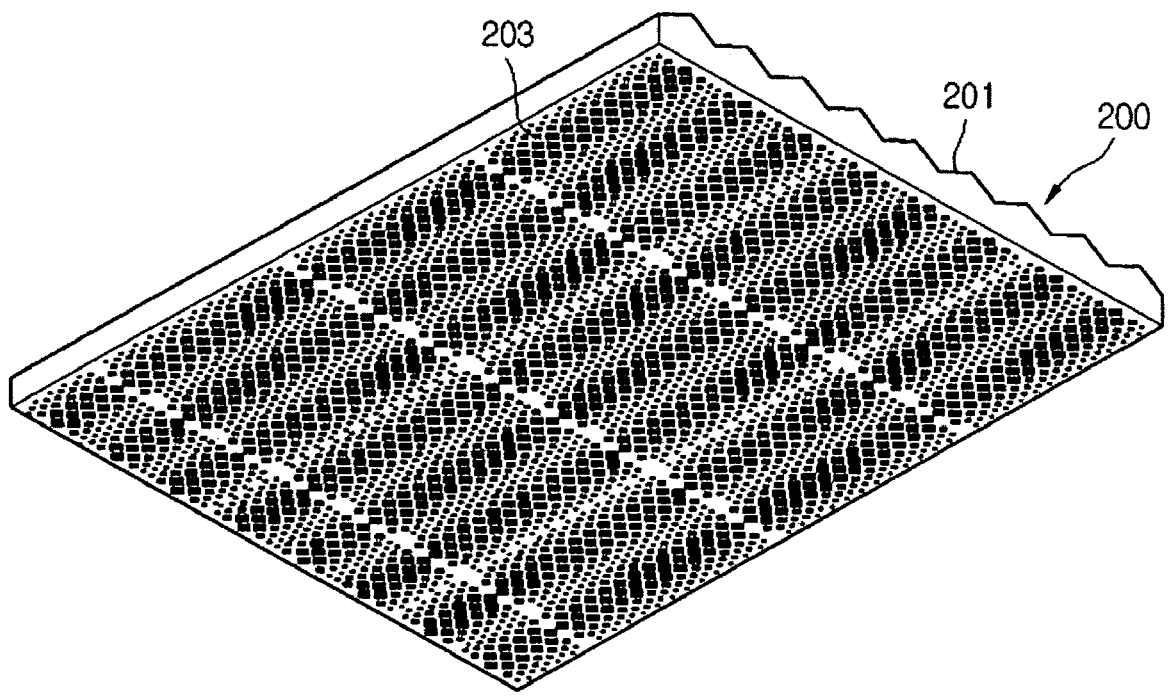
FIG. 9 is a perspective view illustrating a diffusion plate according to a third embodiment of the present invention.
Figure 10:
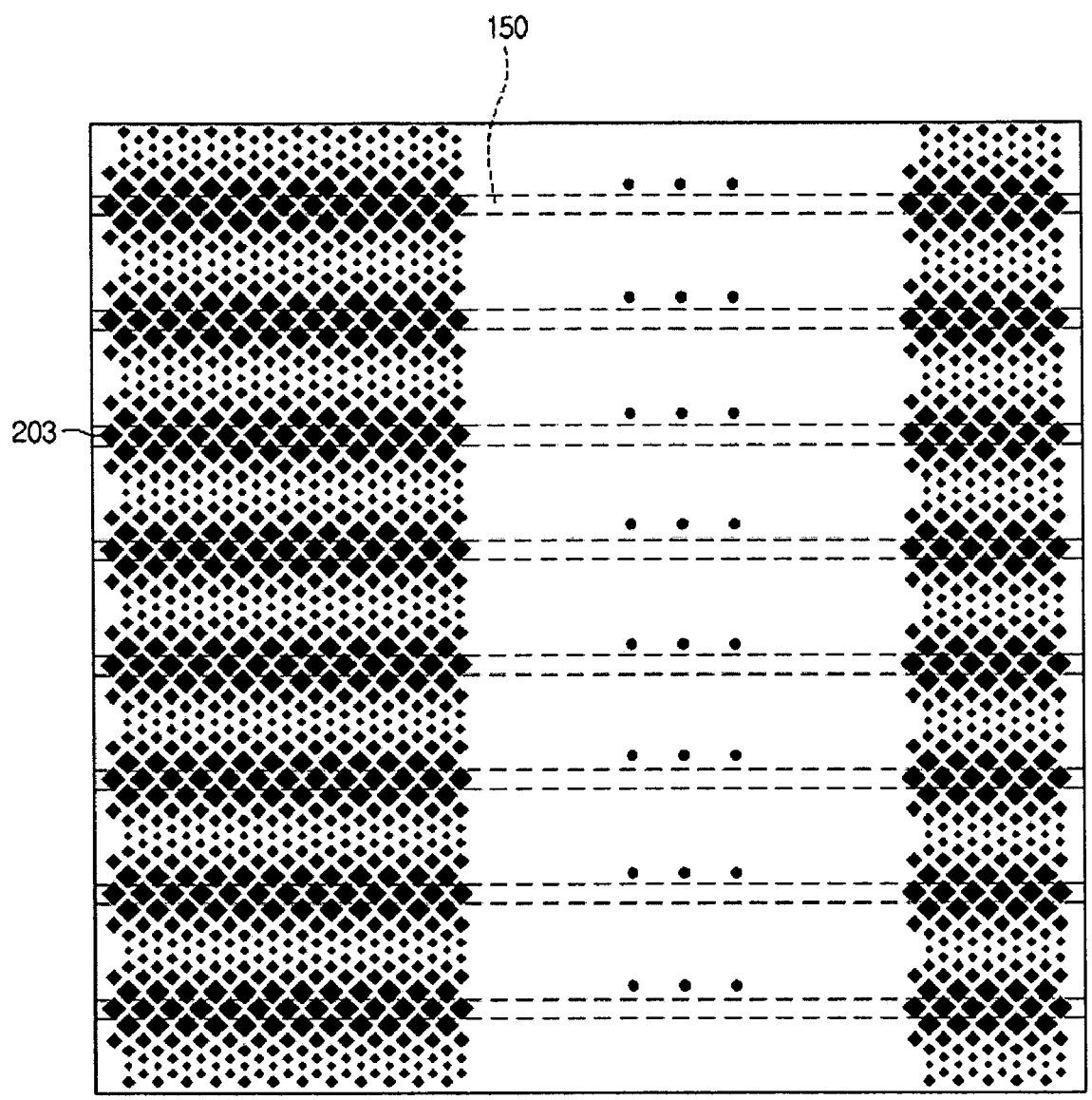
FIG. 10 is a plan view illustrating the bottom of the diffusion plate of FIG. 9.

FIG. 9 is a perspective view illustrating a diffusion plate according to a third embodiment of the present invention, and FIG. 10 is a plan view illustrating the bottom of the diffusion plate of FIG. 9.

As shown in FIGS. 9 and 10, the diffusion plate 200 according to the third embodiment of the present invention is provided at the top thereof corresponding to the optical sheets 130 (see FIG. 8) with a plurality of prismatic patterns 201. Also, the diffusion plate 200 is provided at the bottom thereof corresponding to the light sources 150 with a reflection pattern 203 having different densities depending upon its regions.

The reflection pattern 203 has a diamond shape. The reflection pattern 203 is formed by printing a material exhibiting a high reflexibility, such as silver (Ag). The third embodiment of the present invention is described on the assumption that the reflection pattern 203 has a diamond shape, and the reflection pattern 203 is made of silver (Ag). However, the present invention is not limited to the above-stated conditions. For example, the reflection pattern 203 may have various shapes, such as a triangle, a rectangle, or a circle. Also, the reflection pattern 203 may be made of any materials exhibiting a high reflexibility.

The diamond size of the reflection pattern 203 is gradually decreased from the regions corresponding to the light sources 150 to the regions not corresponding to the light sources 150. That is, the reflection pattern 203, formed at the bottom of the diffusion plate 200, has the largest size at the regions corresponding to the light sources 150 and the smallest size at the regions not corresponding to the light sources 150, whereby the reflection pattern 203 adjusts the amount of light transmitted to achieve uniform light transmission for each region.

In other words, the reflection pattern 203 of the diffusion plate 200 adjusts the density at the regions corresponding to the light sources 150 and at the regions not corresponding to the light sources 150 to adjust the amount of light transmitted.

The prismatic patterns 201, having crests and valleys, are formed at the top of the diffusion plate 200. In the prismatic patterns 201, the top of each crest is rounded.

The prismatic patterns 201 extend in the longitudinal direction of the light sources 150.

In the direct-type liquid crystal display device with the above-stated construction according to the third embodiment of the present invention, the density of the reflection pattern 203, formed at the bottom of the diffusion plate 200, is greater at the regions where the light sources 150 are disposed than at the regions where the light sources 150 are not disposed, whereby it is possible to construct the backlight unit 120 such that the backlight unity 120 has a uniform brightness.

Also, the reflection pattern 203 is formed at the bottom of the diffusion plate 200, and therefore, the distance between the diffusion plate 200 and the light sources 150 is decreased. Consequently, it is possible to reduce the total thickness of the backlight unit 120, and therefore, construct the liquid crystal display device in a slimmed structure.

Fourth~Seventh Embodiments

FIGS. 11A to 11D are plan views illustrating the bottoms of diffusion plates according to fourth to seventh embodiments of the present invention, respectively.

Figure 11A:
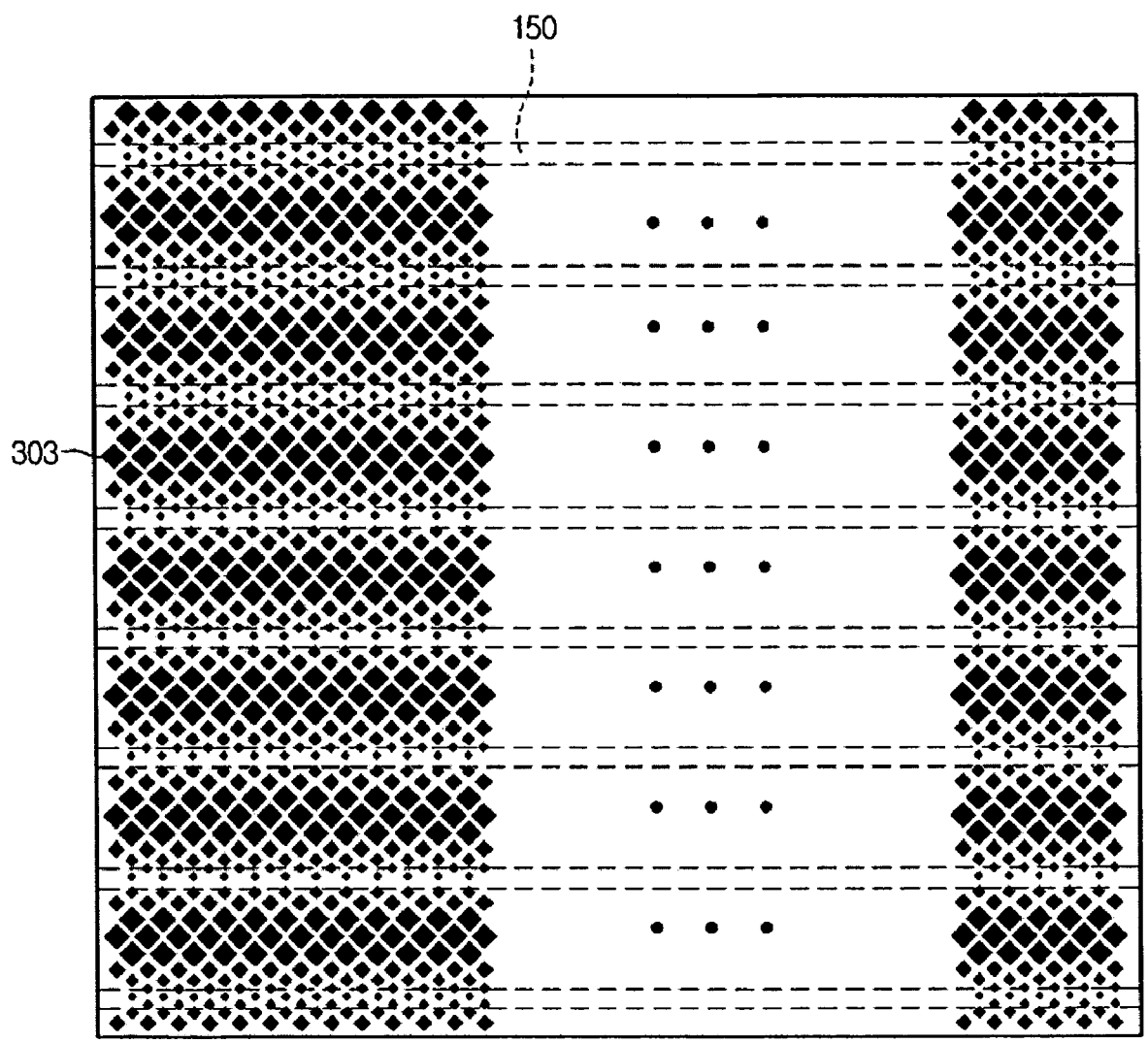
FIGS. 11A to 11D are plan views illustrating the bottoms of diffusion plates according to fourth to seventh embodiments of the present invention, respectively.

Referring to FIG. 11A, the diffusion plate according to the fourth embodiment of the present invention includes a scattering pattern 303 formed at the bottom thereof corresponding to the light sources 150 for scattering light.

The scattering pattern 303 is provided to scatter light. The scattering pattern 303 is configured such that the density of the scattering pattern 303 at the regions corresponding to the light sources 150 is greater than that of the scattering pattern 303 at the regions not corresponding to the light sources 150.

The scattering pattern 303 is formed by a printing process. The scattering pattern 303 includes a scattering material to scatter light (for example, acryl-based resin or transparent resin)

The scattering pattern 303 is formed in a shape having at least three sides or a circular shape.

Figure 11B:
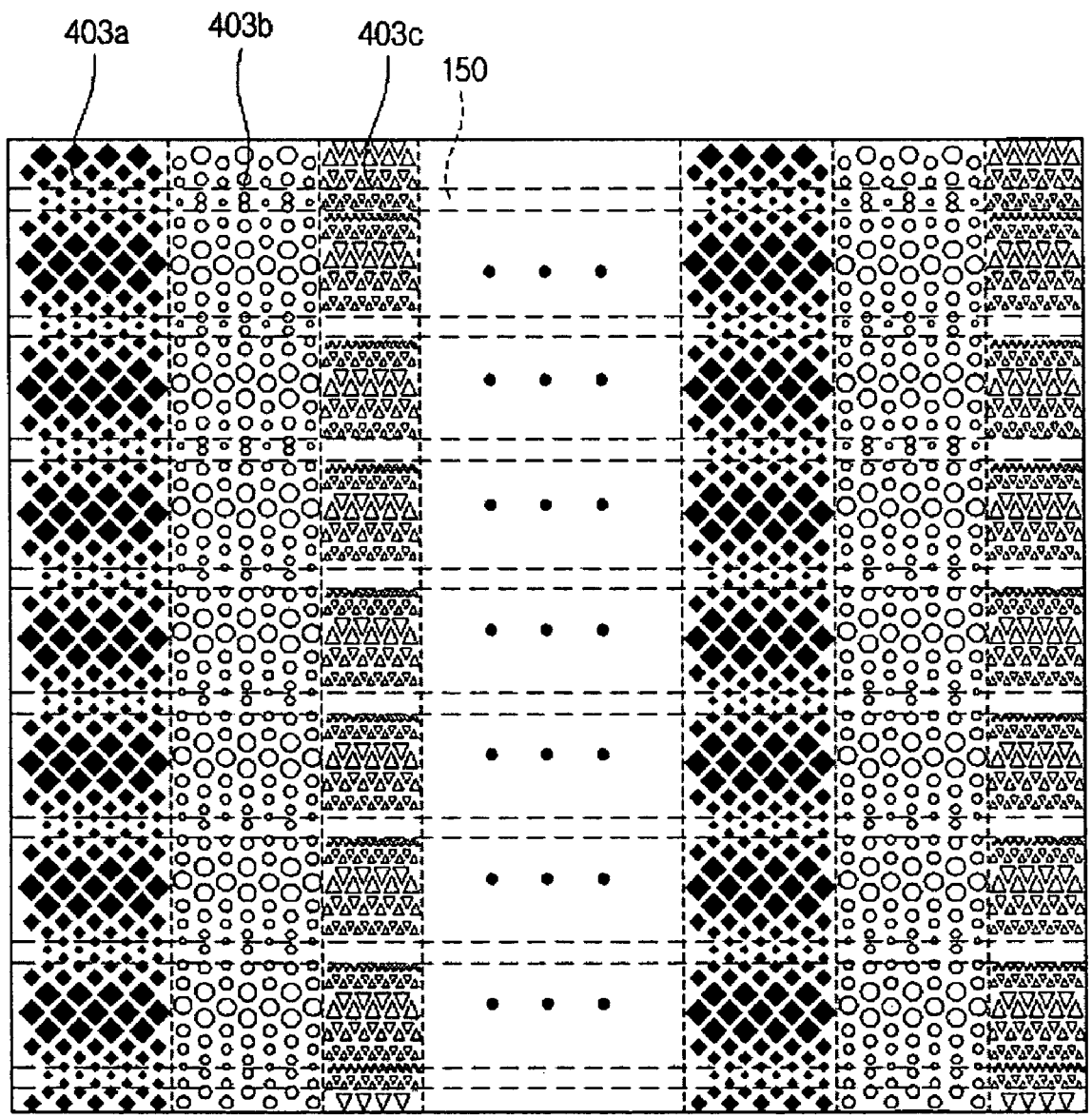

Referring to FIG. 11B, the diffusion plate according to the fifth embodiment of the present invention includes first to third scattering patterns 403a, 403b, and 403c having different shapes.

The first to third scattering patterns 403a, 403b, and 403c are configured such that the pattern size of the first to third scattering patterns 403a, 403b, and 403c at the regions corresponding to the light sources 150 is different from that of the first to third scattering patterns 403a, 403b, and 403c at the regions not corresponding to the light sources 150, and the density of the first to third scattering patterns 403a, 403b, and 403c at the regions corresponding to the light sources 150 is greater than that of the first to third scattering patterns 403a, 403b, and 403c at the regions not corresponding to the light sources 150.

Figure 11C:
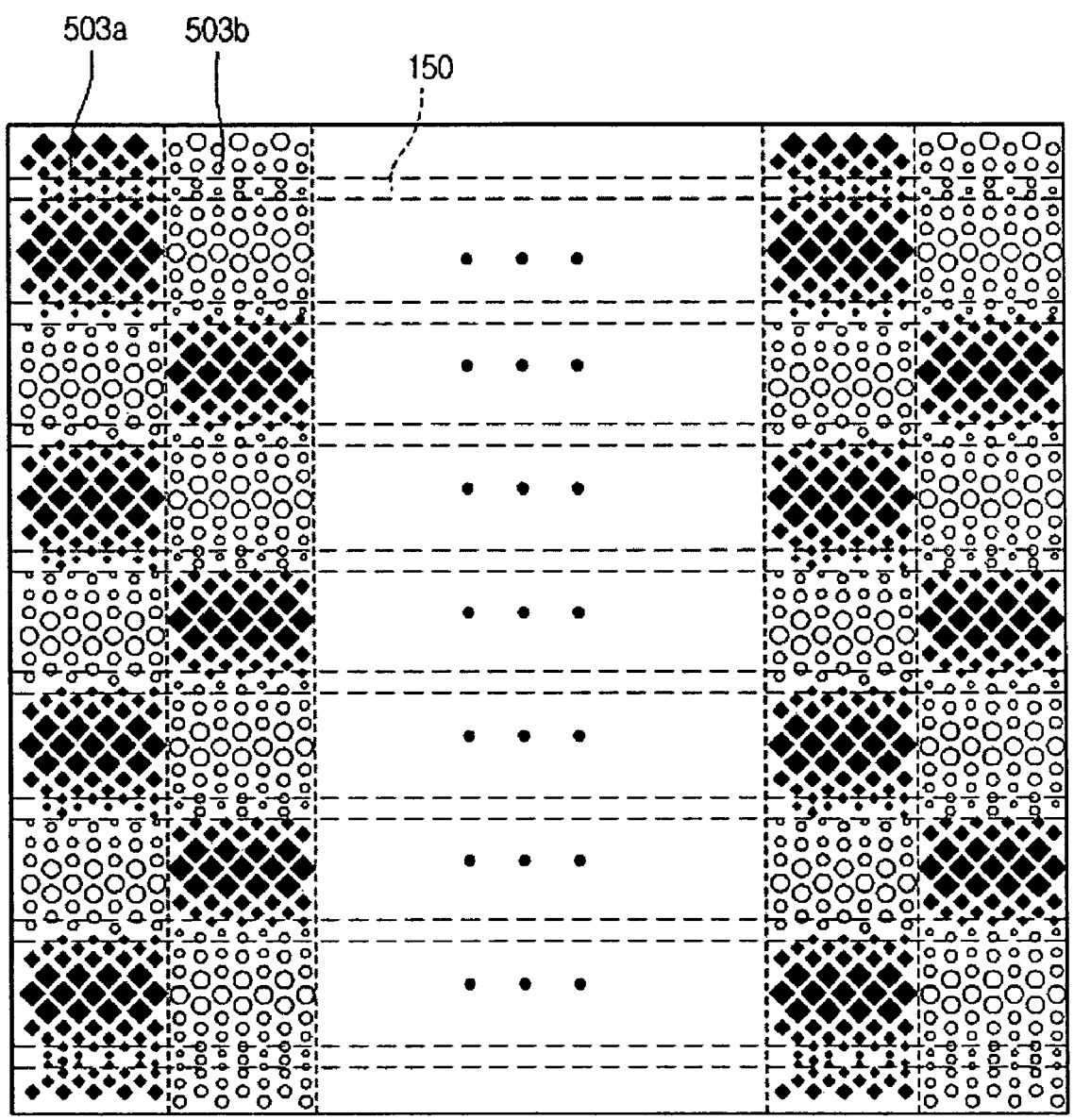

Referring to FIG. 11C, the diffusion plate according to the sixth embodiment of the present invention includes first and second scattering patterns 503a and 503b having different shapes.

The first and second scattering patterns 503a and 503b are alternately formed at the regular intervals in the longitudinal direction of the light sources 150. Also, the first and second scattering patterns 503a and 503b are alternately formed at the regular intervals in the direction (the direction in which the light sources are arranged) perpendicular to the longitudinal direction of the light sources 150.

The first and second scattering patterns 503a and 503b are configured such that the density of the first and second scattering patterns 503a and 503b at the regions not corresponding to the light sources 150 is greater than that of the first and second scattering patterns 503a and 503b at the regions corresponding to the light sources 150.

Figure 11D:
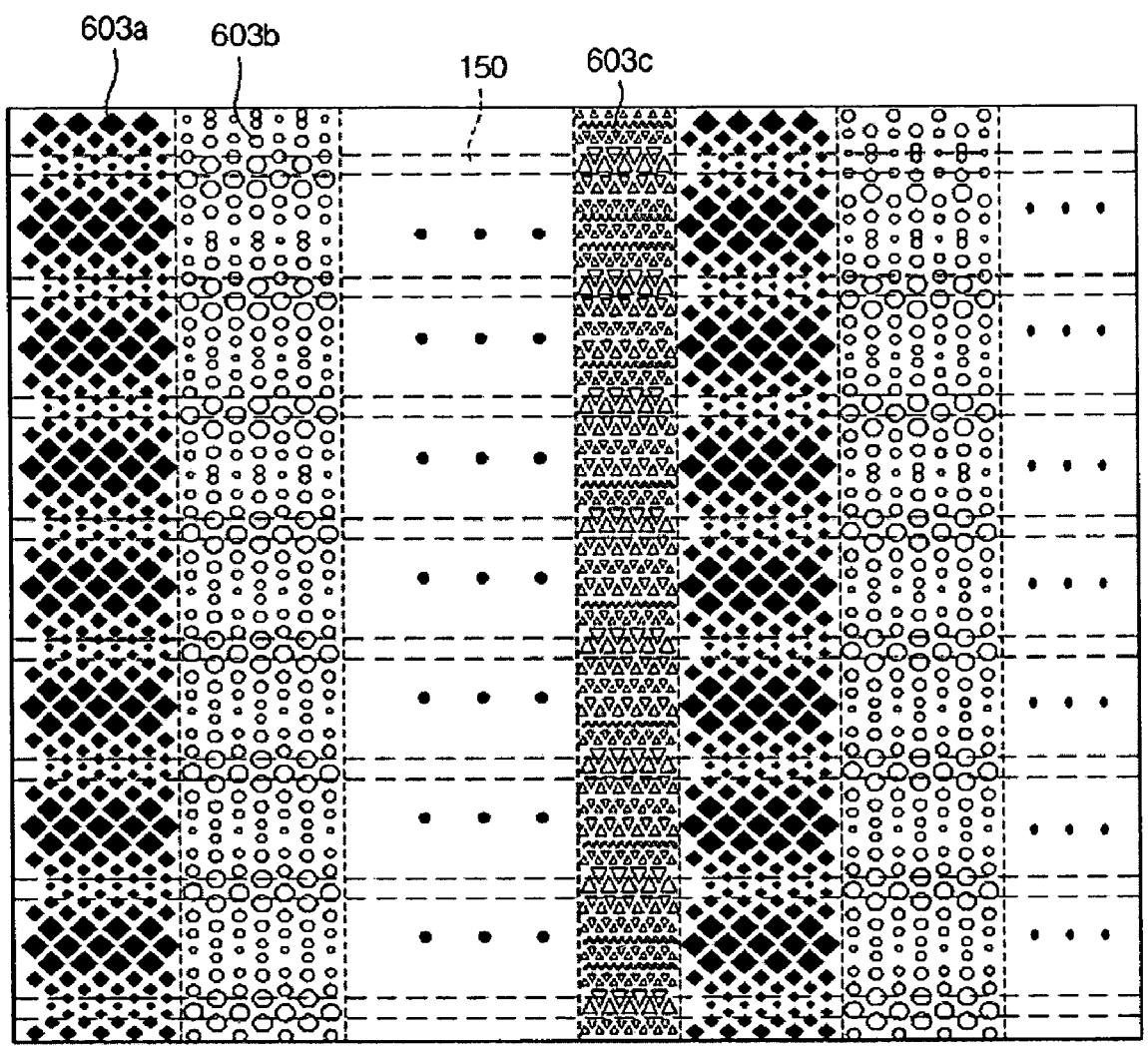

Referring to FIG. 11D, the diffusion plate according to the seventh embodiment of the present invention includes a scattering pattern 603a and first and second reflection patterns 603b and 603c which have different shapes and are alternately disposed in the longitudinal direction of the light sources 150.

The scattering pattern 603a is configured such that the density of the scattering pattern 603a at the regions not corresponding to the light sources 150 is greater than that of the scattering pattern 603a at the regions corresponding to the light sources 150. Also, the first and second reflection patterns 603b and 603c are configured such that the density of the first and second reflection patterns 603b and 603c at the regions corresponding to the light sources 150 is greater than that of the first and second reflection patterns 603b and 603c at the regions not corresponding to the light sources 150.

Meanwhile, the above-described embodiments of the present invention may be used as a light source at the rear or in the front of various display devices, including the above-described liquid crystal display device. In addition, the above-described embodiments of the present invention may be used independently as a light emitting device.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

As apparent from the above description, the backlight unit according to the present invention and the liquid crystal display device having the same have the following effects.

First, the substrate of the diffusion plate is made of a transparent material, whereby the transmissivity is increased, and therefore, the brightness is improved.

Second, the reflection parts, disposed at the lower part of the diffusion plate corresponding to the respective light emitting lamps, partially reflect light emitted from the light emitting lamps to uniformalize the brightness and to prevent the occurrence of the shapes of the light emitting lamps appearing on the top, thereby improving the quality in appearance of the backlight unit and the liquid crystal display device having the same.

Third, the scattering pattern, formed at the bottom of the diffusion plate, is configured such that the density of the scattering pattern at the regions where the light sources are not disposed is greater than that of the scattering pattern at the regions where the light sources are disposed, whereby it is possible to construct the backlight unit such that the brightness of the backlight unit is uniform.

Fourth, the diffusion plate is provided with the reflection pattern and/or the scattering pattern, with the result that the distance between the diffusion plate and the light sources is decreased, whereby it is possible to reduce the total thickness of the backlight unit, and therefore, construct the liquid crystal display device in a slimmed structure.

What is claimed is:

1. A backlight unit comprising:
   a plurality of light emitting lamps disposed above a cover bottom such that the light emitting lamps are arranged at regular intervals;
   a diffusion plate disposed above the light emitting lamps, the diffusion plate including a substrate, reflection patterns formed directly on a bottom surface of the substrate corresponding to the light emitting lamps, and lens parts directly mounted on a top surface of the substrate, wherein the lens part is integrally formed with the substrate and the reflection patterns are formed above the light emitting lamps at positions corresponding to the light emitting lamps in the longitudinal direction of the light emitting lamps in a dot structure; and
   an optical film disposed above the diffusion plate.

2. The backlight unit according to claim 1, wherein the substrate of the diffusion plate is made of polymethyl methacrylate (PMMA), poly carbonate (PC), poly steel (PS), or metal steel (MS).

3. The backlight unit according to claim 1, wherein the lens parts of the diffusion plate are formed in the shape of a lens, prism, pyramid, or embossed structure.

4. The backlight unit according to claim 1, wherein the lens parts are continuously arranged in the longitudinal direction of the light emitting lamps or in a dot structure.

5. The backlight unit according to claim 1, wherein the lens parts are made of a material having a transmissivity different from that of the material of the substrate.

6. The backlight unit according to claim 1, wherein the reflection pattern is made of a reflective material having a transmissivity of 50 to 95%.

7. The backlight unit according to claim 1, wherein the reflection pattern is made of $TiO_2$, $Al_2O_3$, MgO, Ba, or Ag.

8. The backlight unit according to claim 1, further comprising:
   a reflection plate disposed above the cover bottom.

9. The backlight unit according to claim 1, wherein the light emitting lamps include electro luminescence (EL), light emitting diodes (LED), cold cathode fluorescent lamps (CCFL), hot cathode fluorescent lamps (HCFL), or external electrode fluorescent lamps (EEFL).

10. A liquid crystal display device comprising:
   a backlight unit including a plurality of light emitting lamps disposed above a cover bottom such that the light emitting lamps are arranged at regular intervals, a diffusion plate disposed above the light emitting lamps, the diffusion plate including a transparent substrate, a light control part, having reflection patterns or scattering patterns, directly formed at a bottom of the substrate corresponding to the light emitting lamps, and lens parts mounted at a top of the substrate, and an optical film disposed above the diffusion plate, wherein the lens part is integrally formed with the substrate and the reflection patterns or scattering pattern are formed above the light emitting lamps at positions corresponding to the light emitting lamps in the longitudinal direction of the light emitting lamps in a dot structure; and
   a liquid crystal panel disposed above the backlight unit, the liquid crystal panel including an upper substrate and a lower substrate connected to each other while the upper substrate and the lower substrate are spaced a predetermined distance from each other such that liquid crystal is filled in the space between the upper substrate and the lower substrate.

* * * * *